United States Patent [19]
Kamber

[11] 4,078,216
[45] Mar. 7, 1978

[54] CIRCUIT FOR THE PARALLEL COUPLING OF AUDIO FREQUENCY CENTRAL-CONTROL TRANSMITTING STATIONS IN A WAVE BAND FILTER CONSTRUCTION

[75] Inventor: Paul Kamber, Luzern, Switzerland

[73] Assignee: LGZ Landis & Gyr Zug AG, Zug, Switzerland

[21] Appl. No.: 625,370

[22] Filed: Oct. 24, 1975

[30] Foreign Application Priority Data

Nov. 27, 1974  Switzerland ................. 15705/74

[51] Int. Cl.² .............. H03H 7/04; H03H 7/08; H03H 7/46; H03H 7/14
[52] U.S. Cl. ................. 333/76; 333/24 R; 333/77
[58] Field of Search ............. 333/76 R, 77, 70 R, 333/15–18, 28, 24 R, 32

[56] References Cited
U.S. PATENT DOCUMENTS

| | | | |
|---|---|---|---|
| 1,511,013 | 10/1924 | Affel | 333/16 |
| 2,092,709 | 9/1937 | Wheeler | 333/77 X |

FOREIGN PATENT DOCUMENTS 445,245  6/1927  Germany ................. 333/77

OTHER PUBLICATIONS

Chang-Parabolic Loci For Two Tuned Coupled Circuits in Proc. of the Ire (Reprint) Nov. 1948, Title page and pp. 1384–1388.

Primary Examiner—Alfred E. Smith
Assistant Examiner—Marvin Nussbaum
Attorney, Agent, or Firm—Morgan, Finnegan, Pine, Foley & Lee

[57] ABSTRACT

A circuit for the parallel coupling of audio frequency transmitting stations in a wave band filter construction is described, in which the wave band filter consists of two resonant circuits tuned to an audio frequency essentially free of the line harmonics, coupled magnetically to each other, and electrically separated, and in which the line-side circuit has been designed as a series resonant circuit, and the capacitor of the generator-side resonant circuit has been connected in parallel to the audio generator and to the coupling inductance of an ironless coupling transformer.

7 Claims, 2 Drawing Figures

CIRCUIT FOR THE PARALLEL COUPLING OF AUDIO FREQUENCY CENTRAL-CONTROL TRANSMITTING STATIONS IN A WAVE BAND FILTER CONSTRUCTION

BACKGROUND AND BRIEF DESCRIPTION OF THE INVENTION

This invention relates to a circuit for the parallel coupling of audio frequency transmitting stations in a wave band filter construction, wherein the wave band filter has been designed to consist of two resonant circuits tuned to an audio frequency essentially free of the line harmonics, coupled magnetically to each other, and electrically separated, and wherein the line-side circuit has been designed as a series resonant circuit.

Central control stations are designed to transmit command impulses from a central command unit through the electrical mains system to all user terminals of the electrical system for the purpose of switching users on or off, or for any other type of control switching. Audio frequency pulses are fed into the system at the command unit, while the end users to be controlled are equipped with receivers responding to certain commands and executing the switching functions so commanded.

For the selective transmission of the audio frequency to the system to be controlled, and for the electrical separation of the system from the audio generator, coupling filters which are generally coupled in series or parallel are utilized. The type of coupling depends on the type of audio frequency used, unless additional measures are taken. Normally, the parallel type coupling is used for audio frequencies in excess of 300 Hz.

Known parallel couplings for audio frequency-type central control units, for each individual phase, consist of a line-side series circuit supplied with audio energy by the audio generator in the transmitting station via a transformer (isolating transformer). These types of couplings are simple, relatively inexpensive solutions, but are unsatisfactory because they usually cause significant repercussions on the audio generator side. Therefore, it has been suggested that these detrimental effects be reduced, as is usual in the case of series couplings, by means of a reactive network on the audio generator-side connected in parallel to the primary coil of the isolating transformer, wherein said reactive network preferably takes the form of a series circuit with an additional capacitance preferably connected in parallel to said reactive network and compensating for the audio frequency.

In another known parallel coupling, two series resonant circuits are used for similar reasons, one of said circuits being on the system side and one on the audio generator side, and wherein the coils of said circuits are connected in a transformer relationship, preferably coupled hypercritically, but electrically separated. Thereby, a remarkable degree of safety with regard to line repercussions on the audio generator is achieved, together with increased bandwidth and an increase in the audio frequency voltage in the vicinity of the resonant frequency, an increased damping of the first harmonic oscillation as well as the adjacent harmonic of the line frequency, plus a passive protective effect with the push-button protective switch of the audio generator in "open" position. Therefore, this circuit arrangement is especially useful with load-type static inverters in the audio generator.

The present invention concerns the problem of creating a simple circuit for the parallel coupling of audio frequency central-control stations or units of the type mentioned above, which circuit, while retaining the aforesaid advantages, features a higher degree of independence of any audio frequency voltage changes caused by changes in the line impedance, especially changes in the switching status of the system or extreme on-load switching operations.

The above problem is solved by the present invention in that the capacitor of the audio generator-side resonant circuit has been connected in parallel to the audio generator and to the coupling inductance of an ironless coupling transformer.

BRIEF DESCRIPTION OF THE DRAWINGS

An embodiment of the invention is explained with the help of the drawings, in which.

The parallel coupling of a single phase is shown for reasons of simplicity. The audio generator shown at 1 in FIG. 1 may be of any desired design. The four-terminal network, in the form of a parallel resonant circuit with inductance $L_1$ and capacitance $C_1$, is fed by the generator in part directly and in part indirectly through a series resonant circuit with inductance $L_s$ and capacitance $C_s$. The inductance $L_1$ of the parallel resonant circuit constitutes the primary coil of an ironless coupling transformer having a secondary coil $L_2$. The secondary coil has been connected in series to capacitance $C_2$ for the purpose of parallel coupling to the system to be controlled. The impedance of the system to be controlled is represented by load 2.

Figure 1:
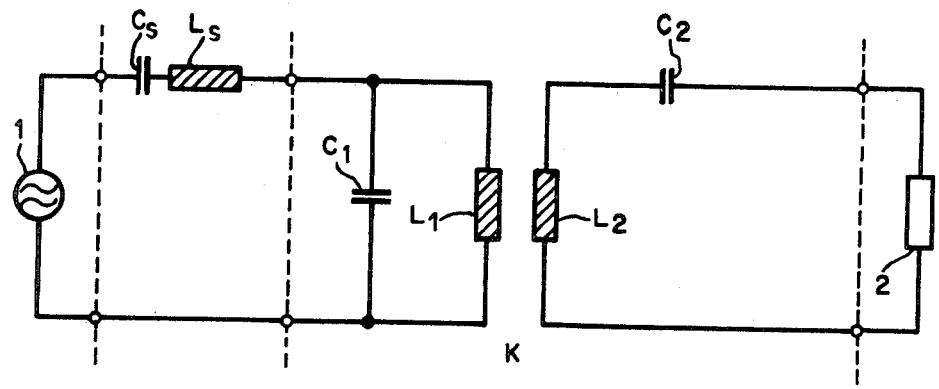
FIG. 1 is a diagram of a parallel coupling according to the instant invention.
Figure 2:
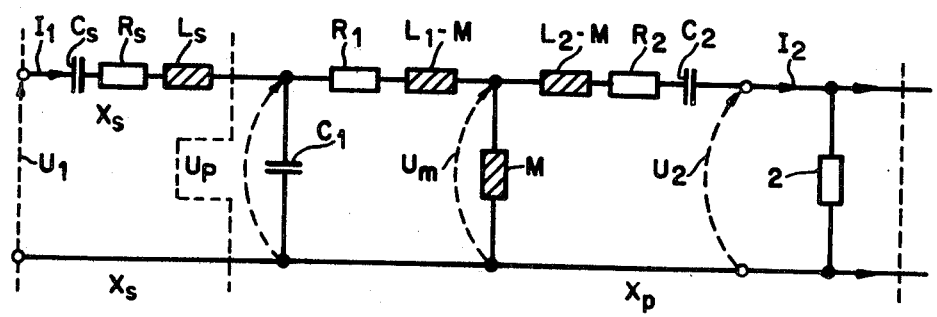
FIG. 2 shows an equivalent circuit diagram for the circuit of FIG. 1.

In FIG. 2, the equivalent circuit diagram for the circuit shown in FIG. 1, $U_1$ designates the output voltage of the audio generator and $I_1$ designates the corresponding output current. $C_s$ and $L_s$ are the impedances of the audio generator-side series resonant circuit with leakage resistance $R_s$ in one feed line of the four-terminal network. The four-terminal network consists of impedances $C_1$, $L_1$—M, leakage resistance $R_1$, mutual inductance M, and impedances $C_2$ and $L_2$—M along with the corresponding leakage resistance $R_2$. $U_2$ is the audio frequency voltage drop at line load 2. Any expansion of the present system or its application for a three-phase operation is self-explanatory.

DETAILED DESCRIPTION

When using an audio frequency generator of the electrodynamic rotary type or a static forcibly commutated inverter, the resonant circuits $C_s$, $L_s$ and $C_1$, $L_1$, and $C_2$, $L_2$ of FIG. 1 are tuned to the audio frequency. The current $I_1$ generates the input open-circuit voltage $U_p$ at the capacitor $C_1$ of the four-terminal network (see FIG. 2), while at the same time generating output open-circuit voltage $U_m$ at the mutual inductance M in the equivalent diagram of FIG. 2 when the audio generator is in operation and connected to the resonant circuits. Because of the impedance situation as a consequence of parallel circuit $C_1$, $L_1$ this circuit carries an amount of current greater than $I_2$, the current flowing in system impedance 2. Thus, the output open-circuit voltage $U_m$ appearing across mutual inductance M is only slightly influences by system impedance 2. Because of this relationship, the mutual inductance M can be kept significantly smaller than inductance $L_2$ of the system-side series resonant circuit $C_2$, $L_2$. Thus, the voltage $U_2$ appearing at system impedance 2 is primarily determined by the voltage drop at leakage resistance $R_2$ of this series resonant circuit. By suitably selecting inductance $L_2$ and its quality factor, the voltage drop at $R_2$ can be kept at a minimum.

The total impedance $X_s$ of the audio generator-side series resonant circuit and the total impedance $X_p$ of the parallel resonant circuit, in the case of on-load inverters, must have a certain relationship to one another. This relationship should be confined to the range $X_s = 0.3 X_p$ to $1.0 X_p$. Results of computations as well as of practical experiments have demonstrated that the impedances must be in the proper ratio, even in the series resonant circuit itself. A lower limit for a faultless functioning of the on-load inverter has been found to be:

$$X_s : X_{Ls} : X_{Cs} = 1 : 2 : 3$$

An economical limit for optimal results has been determined to be:

$$X_s : X_{Ls} : X_{Cs} = 1 : 3 : 4$$

When rotary converters or forcibly commutated inverters are used, the audio generator-side series resonant circuit $C_s$, $L_s$ can be replaced by a single series capacitance $C_s$. In some cases the audio generator-side series resonant circuit may be dispensed with completely.

When using on-load inverters in the audio generator, the individual resonant circuits $C_s$, $L_s$ and/or $C_1$, $L_1$ must be tuned in such a way that their resulting impedance will become capacitive with relation to the audio frequency used. Thus, under all static and dynamic system conditions, a safe and dependable operation of the on-load inverters can be guaranteed.

The utilization of a capacitor parallel to the audio generator-side winding has been known in a parallel coupling transformer, the system-side coil of which is coupled to the system by means of a series capacitance. This special embodiment, however, involves an audio generator with a transformer having an iron core, in which the audio generator-side coil forms an integral part and component of the static audio generator, and in which the generated audio frequency is formed by a multiplication of the system frequency. However, in the parallel coupling circuit in accordance with the present invention there is no integration into the audio generator. Any audio generator can be equipped with the above-described coupling circuit.

The above-described parallel coupling circuit affords practically complete absence of any reactive effect on the audio generator from the system side, regardless of any changes occurring within the system. Audio generators of any make can be coupled to the system. The coupling circuit, by a simple tuning operation, also permits the faultless operation of onload static inverter-type audio generators.

I claim:

1. A circuit for electromagnetically coupling the output of an audio frequency generator operating at an audio frequency to an electrical mains system operating at a system frequency, said audio frequency being different from said system frequency and its harmonics, comprising:

an ironless transformer having a first inductance coil coupled magnetically to a parallel second inductance coil, said first and second inductance coils being electrically separated;

a first capacitor connected in parallel with said first inductance coil to form a generator-side parallel resonant circuit for connection to the audio frequency generator; and a second capacitor connected in series to said second inductance coil to form a system-side resonant circuit for connection to the electrical mains system;

said generator-side resonant circuit and said system-side resonant circuit each being tuned to the output frequency of the audio frequency generator.

2. A circuit according to claim 1, wherein a third capacitor has been connected in series between said generator-side parallel resonant circuit and the audio frequency generator.

3. A circuit according to claim 1, wherein a generator-side series resonant circuit, comprising a third inductance coil in series with a third capacitor, is connected in series between said generator-side parallel resonant circuit and the audio frequency generator, said generator-side series resonant circuit being tuned to the output frequency of the audio frequency generator.

4. A circuit for electromagnetically coupling the output of the audio frequency generator operating at an audio frequency to an electrical mains system operating at a system frequency, said audio frequency being different from said system frequency and its harmonics, comprising:

an ironless transformer having a first inductance coil coupled magnetically to a parallel second inductance coil, said first and second inductance coils being electrically separated;

a first capacitor connected in parallel with said first inductance coil to form a generator-side parallel resonant circuit for connection to the audio frequency generator; and a second capacitor connector in series to said second inductance coil to form a system-side resonant circuit for connection to the electrical mains system;

said system-side resonant circuit being tuned to the output frequency of the audio frequency generator, and said generator-side parallel resonant circuit being tuned to a frequency different from said system frequency and its harmonics so that the impedance of said generator-side resonant circuit is capacitive at the output frequency of the audio frequency generator.

5. A circuit for electromagnetically coupling the output of an audio frequency generator of the on-load static inverter type operating an audio frequency, to an electrical mains system operating at a system frequency, said audio frequency being different from said system frequency and its harmonics, comprising:

an ironless transformer having a first inductance coil coupled magnetically to a parallel second inductance coil, said first and second inductance coils being electrically separated;

a first capacitor connected in parallel with said first inductance coil to form a generator-side parallel resonant circuit for connection to the audio frequency generator;

a second capacitor connected in series to said second inductance coil to form a system-side resonant circuit for connection to the electrical mains system; and a generator-side series resonant circuit, comprising a third inductance coil in series with a third capacitor, connected in series between said generator-side parallel resonant circuit and the audio frequency generator;

said system-side resonant circuit being tuned to the output frequency of the audio frequency generator, and said generator-side parallel resonant circuit and said generator-side series resonant circuit each being tuned to a frequency different from said system frequency and its harmonics so that the impedance of each of said two generator-side resonant circuits is capacitive at the output frequency of the audio frequency generator.

6. A circuit according to claim 5, wherein the ratio of the impedance of said generator-side series resonant circuit to the impedance of said generator-side parallel resonant circuit at the output frequency of the audio frequency generator is in the range 0.3 to 1.0.

7. A circuit according to claim 6, wherein the ratio of the total impedance of the generator-side series resonant circuit to the impedance of its component third inductance coil, to the impedance of its third capacitor at the output frequency of the audio frequency generator is between 1 : 2 : 3 and 1 : 3 : 4.

* * * * *

UNITED STATES PATENT OFFICE
CERTIFICATE OF CORRECTION

Patent No. 4,078,216  Dated March 7, 1978

Inventor(s) Paul Kamber

It is certified that error appears in the above-identified patent and that said Letters Patent are hereby corrected as shown below:

Column 2, line 67, "influences" should read -- influenced --.

Column 4, line 26, "the" should read -- an --

Column 4, line 53, before "an" insert -- at --.

Signed and Sealed this

Twenty-ninth Day of August 1978

[SEAL]

Attest:

RUTH C. MASON
Attesting Officer

DONALD W. BANNER
Commissioner of Patents and Trademarks